Dec. 27, 1938.  E. C. HORTON  2,142,055
VEHICLE SIGNALING SYSTEM
Filed Jan. 21, 1936
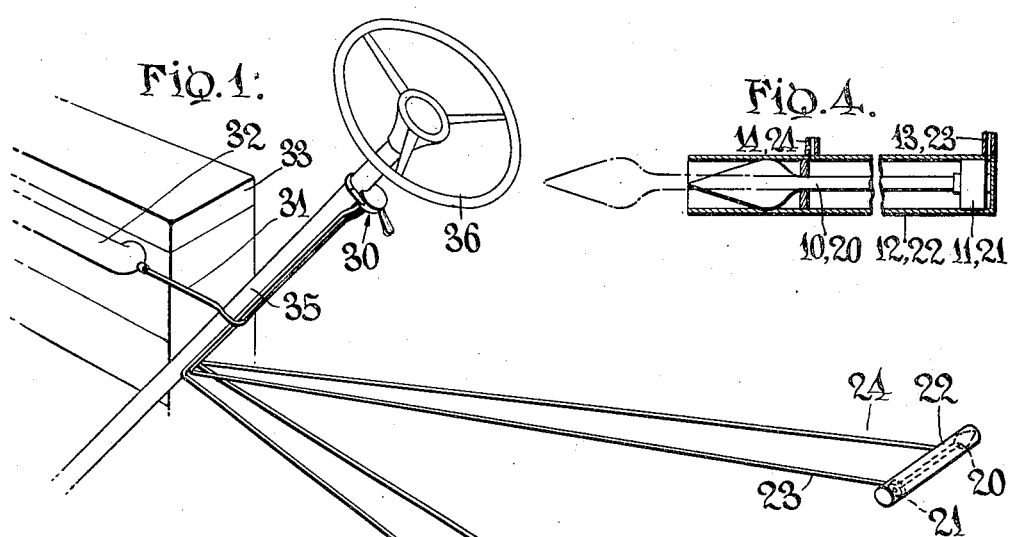
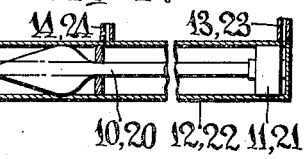
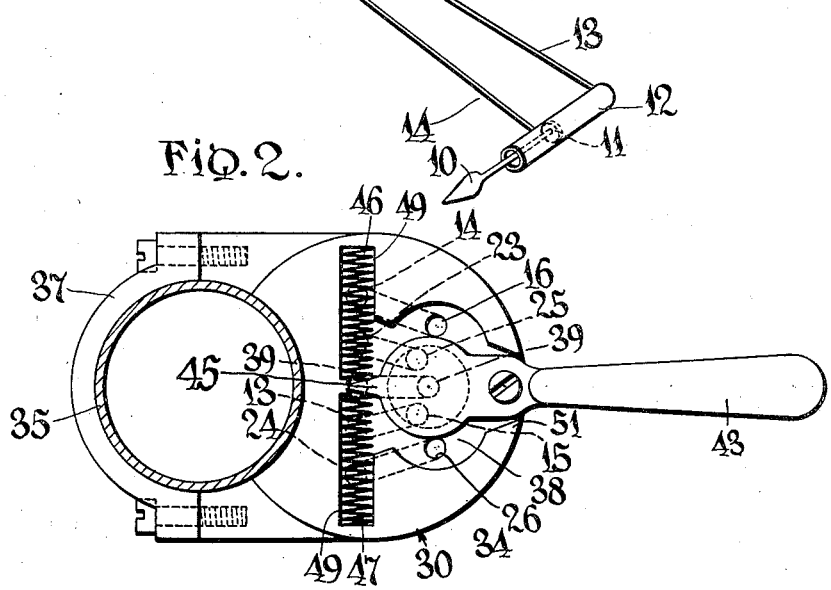
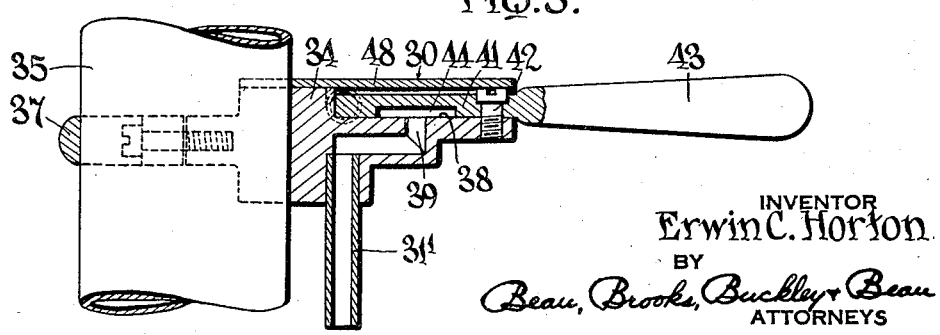
INVENTOR
Erwin C. Horton
BY
Beau, Brooks, Buckley & Beau
ATTORNEYS Patented Dec. 27, 1938

2,142,055

UNITED STATES PATENT OFFICE 2,142,055

VEHICLE SIGNALING SYSTEM

Erwin C. Horton, Hamburg, N. Y., assignor to Trico Products Corporation, Buffalo, N. Y.

Application January 21, 1936, Serial No. 60,114

13 Claims. (Cl. 116—39)

This invention relates to suction operated apparatus and particularly to a vehicle turn signal operated by suction and controlled partially by the vehicle operator and in accordance with the operating condition of the vehicle engine and the controls therefor.

According to the invention there are provided signal means for distinctively indicating "no turn", "left turn", or "right turn". The signal means may be operated by suction supplied from the engine intake manifold through four conduits which extend from the operator's manual control means to the signal means. Depending upon which two of the four conduits are connected to the influence of the manifold suction by the operator's manual control means, the other two conduits being open to the atmosphere, the signal means will indicate "no turn", "left turn", or "right turn".

The control means include parts which are frictionally held in the presence of manifold suction of normal degree, and released for return by spring means to the neutral or "no turn" position when the manifold suction is decreased, as when the engine throttle is opened after a turn is negotiated. In this way the right or left turn indication may remain effective without requiring the operator's attention while the turn is actually being made, and be automatically discontinued thereafter without any further manipulation by the operator.

These and other objects and advantages will become apparent from the following description of the typical embodiment of the invention shown in the drawing, wherein:

Fig. 1 is a diagrammatic view illustrating the application of the invention to an automotive vehicle;

Fig. 2 is a plan view of the signal control unit with the cover plate thereof removed, and with the vehicle steering column upon which the unit is mounted appearing in cross-section;

Fig. 3 is a longitudinal sectional view taken approximately at right angles to Fig. 2; and Fig. 4 is a sectional view illustrating a typical signal unit.

As shown in Fig. 1 the signal apparatus, which may be mounted on the rear of the vehicle, may comprise a left turn signal 10 and a right turn signal 20, signal 10 being secured to a piston 11 and signal 20 to piston 21. The pistons 11 and 21 are slidable in respective cylinders 12 and 22. The signal unit 10, 11, 12 may be identical to signal unit 20, 21, 22 and hence the numerals corresponding to the parts of both signal units have been applied in Fig. 4. Connected to the inner end of cylinder 12 is a suction conduit 13 that is normally connected through the control unit 30 (described hereinafter) to the conduit 31 which is connected to the intake manifold 32 of the vehicle engine 33. Thereby suction maintaining in the manifold will normally be effective through conduit 13 and at the inner face of piston 11 to hold the piston and signal 10 in its innermost and concealed position, shown in full lines in Fig. 4, air under atmosphere being effective on the outer face of the piston through a conduit 14 which extends to the control unit 30.

The cylinder 22 likewise has a conduit 23 connected to its inner end for normally applying suction from the manifold via conduit 31 and control unit 30, for retaining the piston 21 and signal 20 in retracted position, there also being a conduit 24 through which air under atmospheric pressure is normally effective against the outer face of piston 21.

The control unit 30, which normally allows atmospheric air to enter conduits 14 and 24 while placing suction conduit 31 in communication with conduits 13 and 23, so that the signals 10 and 20 will normally be held in retracted or concealed positions, is manually operable to reverse the connections to conduits 13 and 14 or to conduits 23 and 24 so that suction will be applied to the outer face of one of the pistons and atmospheric pressure to the other face thereof, thereby causing the piston and the signal attached thereto to move outwardly, as to the broken line position in Fig. 4, indicating a contemplated direction change of the vehicle.

The unit 30 includes a casing 34 which may be secured to the steering column 35 of the vehicle at a point beneath steering wheel 36 by a suitable clamp 37. The casing has a valve face 38 with a port 39 opening into the center thereof, the port 39 being connected by nipple 31' to suction conduit 31. On opposite sides of port 39 and opening through the valve face 38 on opposite sides of port 39 are ports 15 and 25, respectively connected by suitable nipples (which may be similar to 31') to conduits 13 and 23. Disposed laterally of ports 15 and 25 are ports 16 and 26, which also open through the valve face 38 and are respectively connected by suitable nipples to conduits 14 and 24.

Seated upon valve face 38 is valve 41, pivoted to casing 34 by pin 42, and manually movable in an arcuate path over the valve face by a handle 43. The face of valve 41 which seats upon valve face 38 has a recess 44 of sufficient size to simultaneously overlie any three, but only three adjacent port openings, as ports 16, 25, 39, or ports 25, 39, 15, or ports 39, 15, 26.

The forward end of valve 41 has a finger 45 which engages and compresses one of two springs 46, 47 when the valve is moved from its central and neutral position in a clockwise or counterclockwise direction, and hence the springs serve to maintain the valve in neutral position. A cover plate 48 retains the springs in pockets 49, 49 of the casing 34 and conceals the valve 41. It will be noted that a slight space is provided, as indicated at 51, for allowing air to enter the casing and the two ports (16, 26 or 16, 25 or 15, 26 depending upon the position of the valve) which are not covered by the valve.

The operation of the device is as follows: The springs 46, 47 normally retain the valve 41 in neutral or central position wherein ports 25, 39, and 15 are covered and through recess 44 are in communication. Accordingly, the normal engine manifold suction will be effective upon the inner faces of pistons 11 and 21, through the medium of conduit 31, port 39, recess 44, ports 25 and 15, conduits 13 and 23 and the inner ends of cylinders 12, 22. Simultaneously ports 16 and 26 will be open, allowing atmospheric pressure to become effective, through ports 16 and 26 and conduits 14 and 24, upon the outer faces of the pistons 11 and 21. Accordingly, the pistons and the signals 10 and 20 carried thereby will be held in retracted and concealed positions and a "no turn" signal is given.

When the operator of the vehicle desires to indicate a left turn, the handle 43 is moved to the left (clockwise in Fig. 2), causing the valve 41 to move to the right (clockwise) to uncover port 15 and to cover port 16. Port 26 remains uncovered and port 25 remains covered so that no change is made in the position of the right signal 20. However, suction will now be applied to the outer face of piston 11 via conduit 31, port 39, recess 44, port 16, conduit 14 and the outer end of cylinder 12, while atmospheric pressure is applied to the inner face of piston 11 via space 51, port 15, conduit 13, and the inner end of cylinder 12. Hence the piston will move outwardly (to the left or broken line position in Fig. 4) carrying the signal 10 into its signaling position indicating "left turn".

Just before and while the turn of the vehicle is being made the engine throttle will normally be partially closed so that manifold suction will be great. Due to the consequent partial evacuation of recess 44 in the valve 41 and the presence of atmospheric pressure on the outer face of the valve, the valve will be tightly pressed upon its seat, and such pressure will increase the friction between the valve and its seat to such an extent that the spring 46 will be unable to move the valve to neutral position. Hence, even though the operator's hand is removed from handle 43, the signal 10 will remain operative until the engine throttle is again opened to decrease the suction to such extent that the spring 46 can return the valve 41 to neutral position, and, of course, the valve may at any time be moved to neutral position by the operator. When neutral position is assumed by the valve, the signal 10 will again be retracted, the condition being that described in the second paragraph above.

When the operator desires to indicate a right turn, handle 43 is moved to the right (counterclockwise in Fig. 2) whereupon valve 41 covers ports 26, 15 and 39, connecting conduits 24 and 13 to the source of suction, while ports 25 and 16 are uncovered, allowing air under atmospheric pressure to enter conduits 23 and 14. Accordingly, signal 10 will remain retracted while right turn signal 20 will be moved outwardly by piston 21 to position indicating "right turn". Normally this signal will remain at such indicating position until the throttle is next opened, for the reason above pointed out.

What is claimed is:

1. In a signaling system for a motor vehicle, signal apparatus including signals having members movable by the application of suction and atmospheric pressure to opposing faces thereof, means for normally applying suction to one face of each movable member and atmospheric pressure to the other face thereof for normally retaining the signals in non-indicating position, and means for reversing the application of suction and atmospheric pressure to the faces of the movable member of either signal to effect movement of the signal by the movable member to indicating position, said last mentioned means including means for maintaining the reversal of suction and atmospheric pressure while the suction exceeds a predetermined degree and for causing reversion to normal when the suction is less than said degree.

2. In a signaling system for a motor vehicle, signal apparatus including signal means and members movable by suction and operably associated with the signal means, a source of suction, manually controlled means for normally applying suction and atmospheric pressure to opposing surfaces of the movable members for retaining the signal means in normal position, said manually controlled means being manually movable from normal to a first operated position to change the application of suction to another surface of said members to effect movement of the signal means to a first indicating position or movable from normal to a second operated position to change the application of suction to still another surface of said members to effect movement of the signal means to a second indicating position, and said manually controlled means including means for retaining it in either operated position while the suction is above a predetermined degree and for returning it to normal position in the absence of suction of said predetermined degree.

3. In a signaling system for a motor vehicle, signal apparatus including signal means and members operably associated therewith movable by application of suction and atmospheric pressure to opposing faces thereof, a source of suction, a control unit connected to said source, and conduits from the control unit to the signal apparatus, said control unit having manually movable means for normally applying suction and atmospheric pressure through said conduits to opposing faces of said members to retain the latter and the signal means in non-indicating position, said manually movable means being movable to one operated position to reverse the application of suction and atmospheric pressure upon one of the members to move the signal means to one indicating position, and said manually movable means being movable to another operated position to reverse the application of suction and atmospheric pressure upon another of the members to move the signal means to another indicating position, and the control unit having means for holding said manually movable means in either operated position while the suction is above a predetermined degree and for returning it to normal position in the absence of such of said predetermined degree.

4. In a signaling system for motor vehicles, a source of suction, signal apparatus controlled by differential air pressures and conduits for air extending therefrom, a control unit having a valve seat with a port in communication with the source of suction and a port communicating with each of said conduits, a valve slidable on said valve seat, said valve having a recess in the face thereof adapted to effect communication between adjacent ports whereby movement of the valve to one position will open fluid communication between the source of suction and one conduit and upon movement to another position will open fluid communication between the source of suction and another conduit, the port not covered by the valve admitting atmospheric air into the communicating conduit, the valve recess in either of said moved positions of the valve overlying the port communicating with the source of suction, the valve being held against free movement upon the valve seat by pressure of the atmosphere when the suction is of a predetermined degree, and means for urging the valve to a predetermined one of its positions when the suction is less than said predetermined degree.

5. In a signaling system for motor vehicles, a source of suction, signal apparatus controlled by differential air pressures and conduits for air extending therefrom, a control unit having a valve seat with a port communicating with the source of suction and other ports adjacent thereto connected to said conduits, a valve upon the valve seat and having a recess adapted to open communication between the ports covered by the valve, atmospheric air being admissible to ports not covered by the valve, said valve being movable from a normal position to different positions wherein the recess opens communication between the port communicating with the source of suction and different ports, the valve being held against free movement upon the valve seat by pressure of the atmosphere when the suction is of a predetermined degree, and means for moving the valve to a normal position when the suction is less than said predetermined degree.

6. In a signaling system for a motor vehicle, signals having members movable by the application of suction and atmospheric pressures to opposing faces thereof, means for normally applying suction to one face of each movable member and atmospheric pressure to the other face thereof for normally retaining the signals in non-indicating position, and means for reversing the application of suction and atmospheric pressure to the faces of the movable member of either signal to effect movement of the signal by the movable wall to indicating position, said reversing means having a part held by suction when the latter is of predetermined degree or greater for retaining a signal in operated position, and means for moving said part from the held position to enable return of the signal to non-indicating position when the suction is of lesser degree.

7. In a signaling system for a motor vehicle, signal means having members movable by suction, a source of suction of variable degree, manually controlled means for normally applying suction and atmospheric pressure to opposing surfaces of the movable members for retaining said signal means in normal position, said manually controlled means being manually movable from normal position to a first operated position to change the application of suction to another surface of said members to effect movement of the signal means to a first indicating position or movable from normal to a second operated position to change the application of suction to still another surface of said members to effect movement of the signal means to a second indicating position, said manually controlled means including a suction holding device for holding the manually controlled means in an operated position when the suction is of an effective degree, and means for returning the manually controlled means to normal position when the suction is of an ineffective degree.

8. In a control unit for a signal, cooperating with a variable suction producing fluid intake of a vehicle engine, a valve seating member having a seating surface, a movable valve member normally disposed in an inoperative position and having a surface slidably movable in seating relation upon the seating member to an operative position, the surface of one of said members having a recess in facing relation to the other member and connectible to said fluid intake to provide a subatmospheric area between cooperating portions of said members, whereby suction of the intake at predetermined value will hold said members in an operative position against relative movement, and means urging movement of the valve member from the operative to the inoperative position when the suction is less than the predetermined value.

9. In a fluid control unit for fluid actuated dual indication signals cooperating with the fluid intake of a vehicle engine, a fluid control member movable from a first position to either one of plural other positions for controlling the flow of fluid which actuates said signals, means for urging return of the member from any of said other positions to the first position, means connecting the unit with the fluid intake, and means effective when the suction therein is above a predetermined degree for holding said member against return by the first mentioned means.

10. In a fluid control unit for a fluid actuated device, a fluid control member movable from a first position to either one of plural other positions for controlling the flow of fluid which actuates said device, means for urging return of the member from any of said other positions to the first position, means connecting the unit with a variable source of suction, and means associated with the unit and effective when the suction is above a predetermined degree for holding said member against return by the first mentioned means.

11. In dual signal indication apparatus for a motor vehicle having an engine with a fluid intake, a pair of fluid actuated signals normally in non-indicating condition, fluid control means for said signals including a member movable from rest to one or the other of two operating positions for effecting an indicating condition of one or the other signal of said pair of signals by controlling the flow of fluid which actuates said signals, and said fluid control means including means responsive to suction at said fluid intake for retaining said member in either operating position when the suction is above a predetermined degree and otherwise allowing the member to return to rest position to effect a non-indicating condition of the signal.

12. In control means for suction apparatus, a valve seat having a central port connectible to a source of suction and having lateral ports on opposite sides of the central port connectible to the suction apparatus, and said valve seat having an intermediate port between the central port and each lateral port, said intermediate ports being connectible to the suction apparatus, a valve slidable to different positions upon the valve seat and having a recess in its seated face adapted to overlie and open communication between either the central port and both intermediate ports or the central port and the intermediate and lateral ports on either side of the central port, and means tending to move the valve into or retain it in one of its positions when the suction effective upon the adjacent portions of the valve seat and valve is insufficient to hold the latter against movement with respect to the valve seat.

13. In a control means for suction apparatus, a valve seat having a central port connectible to a source of suction and having lateral ports on opposite sides of the central port connectible to the suction apparatus, and said valve seat having an intermediate port between the central port and each lateral port, said intermediate ports being connectible to the suction apparatus, a valve slidable to different positions upon the valve seat and having a recess in its seated face adapted to overlie and open communication between either the central port or both intermediate ports or the central port and the intermediate and lateral ports on either side of the central port, the suction when of predetermined degree or greater retaining the valve in any one of said positions thereof, and resilient means effective when the suction is of lesser degree for moving the valve to the position wherein it overlies the central and intermediate ports.

ERWIN C. HORTON.